No. 820,736. PATENTED MAY 15, 1906.
W. J. RHODES.
TENSION DEVICE.
APPLICATION FILED NOV. 9, 1905.
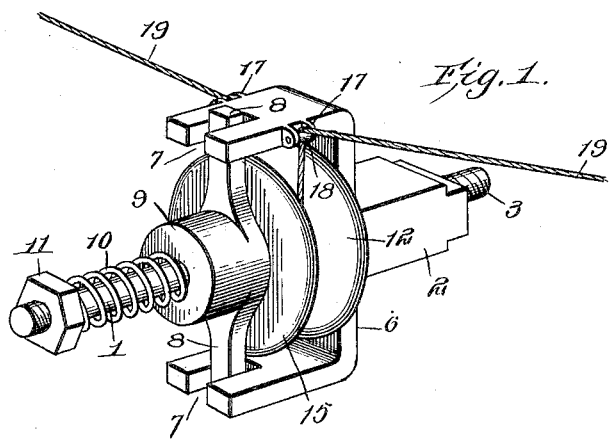
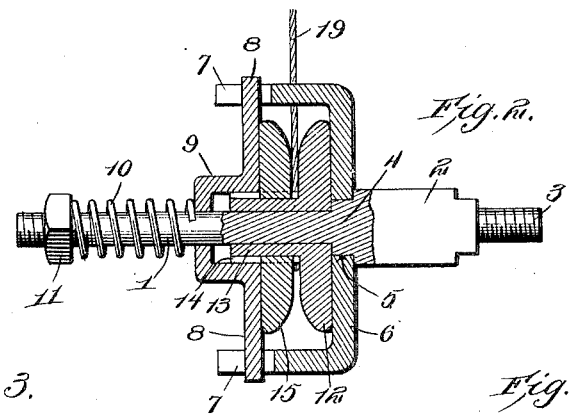
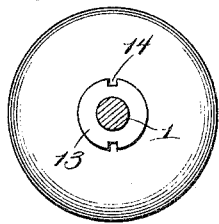
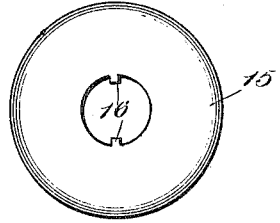
Inventor
W. J. Rhodes
Witnesses
Louis R. Heinrichs
Herbert D. Lawson
By W. J. FitzGerald & Co.
Attorneys

UNITED STATES PATENT OFFICE.

WILLIAM J. RHODES, OF ELIZABETH, INDIANA.

TENSION DEVICE.

No. 820,736.

Specification of Letters Patent.

Patented May 15, 1906.

Application filed November 9, 1905. Serial No. 286,617.

*To all whom it may concern:*

Be it known that I, WILLIAM J. RHODES, a citizen of the United States, residing at Elizabeth, in the county of Harrison and State of Indiana, have invented certain new and useful Improvements in Tension Devices; and I do hereby declare the following to be a full, clear, and exact description of the invention, such as will enable others skilled in the art to which it appertains to make and use the same.

My invention relates to tension devices for binders; and its object is to provide a simple, durable, and compact device of this character which will hold cord under tension, said tension being capable of adjustment.

A still further object is to provide a novel form of spool on which the cord is mounted, said spool being formed of sections which are adapted to clamp the cord.

With the above and other objects in view the invention consists of a bracket in which is mounted a stem having a plate slidably supported thereby, said plate being spring-pressed and contacting with the sliding member of a sectional spool, which is located on the stem between the bracket and plate. All portions of the spool rotate in unison upon the stem, but are at the same time capable of lateral adjustment.

The invention also consists in further novel construction and combination of parts, hereinafter more fully described and claimed.

In the accompanying drawings I have shown the preferred form of my invention, and in said drawings—

Figure 1 is a perspective view of the tension device and showing a cord engaging the same. Fig. 2 is a section through the tension device. Fig. 3 is a section through the main member of the spool, and Fig. 4 is an inner elevation of the other member thereof.

Referring to the figures by numerals of reference, 1 is a stem having a head 2, which is preferably angular and provided with a second stem 3, which is adapted to engage any suitable support, so that the tension device may be securely fastened in proper position within a binder. The head 2 has an angular reduced portion 4, which projects into an angular opening 5, formed within the bracket 6, the ends of which are bent laterally and are parallel, each end being slotted, as shown at 7, for the reception of a cross-bar 8. The central portion of this cross-bar is enlarged and recessed, as shown at 9, and a spring 10 is mounted on the stem 1 and bears at one end against the enlarged portion of the crossbar, while its other end contacts with the nut 11, threaded on the stem.

Rotatably mounted on the stem and contacting with the bracket 6 is the main member 12 of the spool. This member has a tubular extension 13 at the center thereof, which surrounds the stem 1 and has grooves 14 therein. A disk-like member 15 constitutes the other section of the spool, and this member is mounted on the tubular extension 13 and has lugs 16, which fit within the grooves 14, so that the two members 12 and 15 must necessarily rotate together; but said member 15 is at the same time capable of moving longitudinally of the extension 13.

As heretofore stated, the member 12 contacts with bracket 6. The member 15 contacts with the cross-bar 8, and as this bar is spring-pressed it will be obvious that the two spool-sections are normally pressed together. The tension of the spring 10 can be regulated by means of the nut 11. Ears 17 extend from the upper end of bracket 6 and have spools 18, journaled therebetween, these spools being disposed upon opposite edges of said end. The cord 19 is adapted to pass over one of the spools 17 and down between the spool-sections 12 and 15 and then around the extension 13 of section 12 and up over the other spool 18.

It will of course be understood that when the cord is drawn between the spool-sections 12 and 15 it will force them apart and increase the tension of spring 10, and therefore the cord will be tightly clamped between the spool-sections and will be retarded in its movement therebetween. The bracket 6 and the cross-bar 8 serve to retard the rotation of the spool, and by adjusting the nut 11 the tension of the spring can be regulated, so as to cause the spool to rotate freely or not, as desired.

It will be noticed that the cord does not come into contact with the stem 1, but instead contacts at all times with the spool-sections only, and the extension 13 of the spool-section 12 relieves the stem of all wear. Either or both of the sections of the spool can be quickly replaced should they become worn or broken, and as the device is very simple and compact in construction it will be found very desirable for use upon binders.

Having thus fully described my invention, what I claim as new, and desire to secure by Letters Patent, is—

1. A tension device of the character described, comprising a stem, a non-rotatable bracket mounted thereon, a cross-bar engaging the bracket and slidably mounted on the stem, a spool-section rotatably mounted on the stem and having a grooved tubular extension, another spool-section slidably mounted on the extension and rotatable therewith, both of the spool-sections being interposed between and contacted by the bracket and cross-bar, and tensioning means contacting with and adapted to actuate the cross-bar.

2. A tension device comprising a stem, a bracket fixedly mounted thereon, a spring-pressed cross-bar slidably mounted on the stem and engaging the bracket, and a sectional spool interposed between the bracket and cross-bar, one of said sections constituting a support for the other section and said sections being normally clamped together by the bracket and cross-bar.

3. A tension device comprising a stem, a bracket fixedly connected thereto and having guide-spools thereon, a cross-bar slidably mounted on the stem and engaging the bracket, a tension-spring upon the stem and bearing on the cross-bar and a sectional spool rotatably mounted on the stem and interposed between the bracket and cross-bar, one of the sections of the spool being slidably mounted on, but rotatable with the other section and both sections being normally clamped together by the bracket and cross-bar.

In testimony whereof I have signed my name to this specification in the presence of two subscribing witnesses.

WILLIAM J. RHODES.

Witnesses:
 CHARLES McKINNEY,
 WM. HIGHFILL.